United States Patent [19]

Dobson

[11] 4,257,481

[45] Mar. 24, 1981

[54] CEMENT PANEL HEAT EXCHANGERS

[76] Inventor: Michael J. Dobson, Barnhouse, Kemerton, Tewkesbury, Gloucestershire, England

[21] Appl. No.: 692,507

[22] Filed: Jun. 3, 1976

[30] Foreign Application Priority Data

Jun. 5, 1975 [GB] United Kingdom ............... 24239/75
Oct. 4, 1975 [GB] United Kingdom ............... 40717/75

[51] Int. Cl.³ .................. F28F 3/12; F28F 21/04; F24J 3/02
[52] U.S. Cl. ............................ 165/168; 52/220; 126/436; 126/448; 165/45; 165/79; 165/171; 165/180; 165/DIG. 8
[58] Field of Search ............... 126/271, 448, 436, 450; 237/1 A; 165/49, 53, 79, 164, 168, 169, 171, 45, 180, DIG. 8; 52/220, 600

[56] References Cited

U.S. PATENT DOCUMENTS

| 2,126,301 | 8/1938 | Wolcott | 52/600 |
| 3,022,781 | 2/1962 | Andrassy | 126/271 |
| 3,190,816 | 6/1965 | Adamec | 126/271 |
| 3,239,000 | 3/1966 | Meagher | 165/46 |
| 3,262,493 | 7/1966 | Hervey | 126/271 |
| 3,495,653 | 2/1970 | Vajda | 165/53 |
| 3,498,371 | 3/1970 | Zygiel | 165/168 |
| 3,626,149 | 12/1971 | Carney et al. | 165/185 |
| 3,693,711 | 9/1972 | Zygiel | 165/164 |
| 3,782,132 | 1/1974 | Lohoff | 165/49 |
| 3,808,085 | 4/1974 | Givens, Jr. | 52/600 |
| 3,853,309 | 12/1974 | Widmer | 165/180 |
| 3,893,506 | 7/1975 | Laing | 237/1 A |
| 3,946,720 | 3/1976 | Keyes et al. | 126/270 |
| 4,000,851 | 1/1977 | Heilemann | 237/1 A |
| 4,011,856 | 3/1977 | Gallagher | 126/271 |

FOREIGN PATENT DOCUMENTS 2245152 3/1973 Fed. Rep. of Germany ............ 165/49
762759 9/1934 France ..................... 126/271

Primary Examiner—Sheldon Jay Richter
Attorney, Agent, or Firm—James W. Bock

[57] ABSTRACT

A heat exchange element for solar heating is made of a solidified material such as concrete, cement, ceramic or resin bonded particulate material. Internal ducting is provided by embedded pipes or within the material itself. In the latter case a former is removed after the material is set, and this may be a rigid member, or one that can be dissolved or melted out. The element is preferably a laminated panel-like structure, possibly with fibre reinforcement.

4 Claims, 14 Drawing Figures

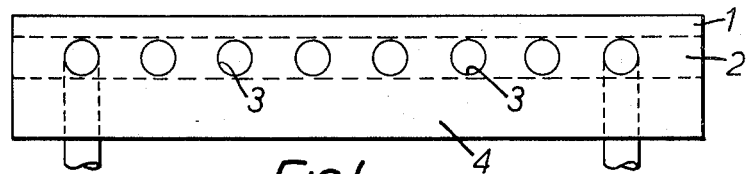
FIG. I.
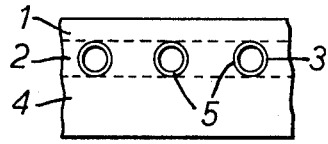
FIG. 2.
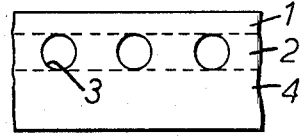
FIG. 3.
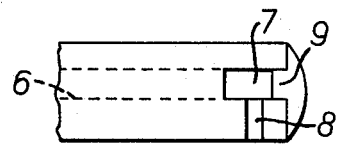
FIG. 4.
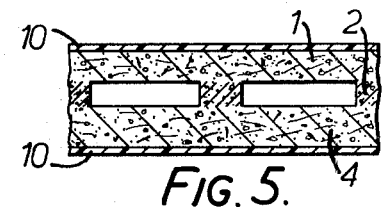
FIG. 5.
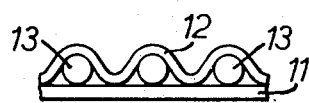
FIG. 6.
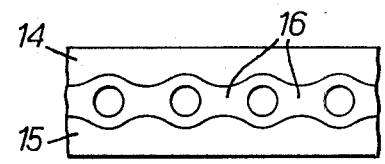
FIG. 7.
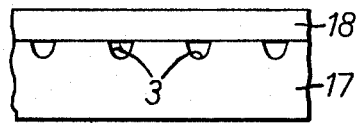
FIG. 8.
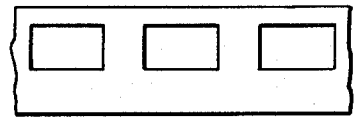
FIG. 9.
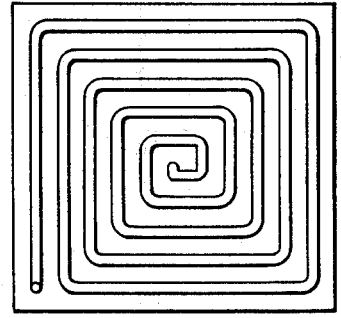
FIG. 10.
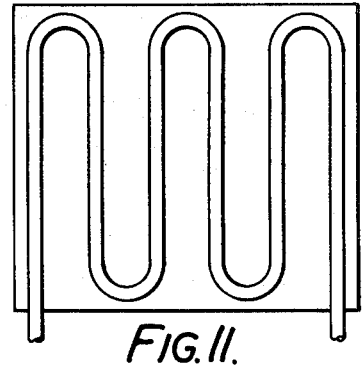
FIG. 11.

CEMENT PANEL HEAT EXCHANGERS

This invention relates to heat exchange elements. It is particularly concerned with such elements for use in solar heating systems.

A lot of attention has been directed to solar heating systems, and particularly to panels which are fitted to the roofs of buildings in order to heat domestic supplies. These are usually quite expensive structures, using copper or aluminium and being encased in glass, sometimes even being double glazed. Also, they are backed by thick insulation. For domestic use, they can be quite small, of the order of a few square meters, as long as they are made efficient. This makes installation easy and does not detract much from the appearance of the building to which they are fitted.

However, there are some applications where a large space is available and where small and expensive panels are really unnecessary or unsuitable. An example of this is the surround to a swimming pool, which is normally paved and covers an area larger than the pool itself. During the summer, this area can be subject to prolonged exposure to the sun, which will strike it at not very acute angles. It is an object of this invention to provide a simple and inexpensive heat exchange element in order to make use of such an area as a means for heating water.

According to one aspect of the present invention there is provided a heat exchange element constructed as a solidified slab or panel of an initialy wet mix, such as concrete, cement, clay, or particulate material mixed with a resin bonding agent, and incorporating a liquid conduit having an inlet and outlet to and from the slab or panel.

Preferably this element is a layered structure including an upper layer whose expose surface is black or dark coloured, a middle layer containing at least a main portion of said conduit, and a lower layer which provides an insulating backing.

The conduit may in one version be an embedded pipe of plastics or metal, with the ends of the pipe protruding from the slab or panel for ease of connection. Alternatively the conduit may be formed within and by the slab or panel.

The arrangement of the conduit may be in any of a great number of different ways, but one preferred configuration is a spiral. An alternative is a serpentine path. Whichever configuration is adopted the aim is for a large length of ducting within a relatively small area without to many severe bends.

The basic material of the element may have a fibre reinforcemet, and with the layered structure it is particularly desirable to have this in the upper and lower layers.

The inlet and outlet to and from the conduit may be at any convenient points, but it is preferred to have them substantially normal to the lower layer.

According to another aspect of the present invention there is provided a solar heating system comprising an array of heat exchange elements as defined above, wherein main flow and return pipes are set into the ground or other backing on or against which the slabs are laid, and the inlets and outlets of the panels are coupled to these pipes.

Conveniently the pipes have T-junctions at intervals and the stems extend towards the plane of the panel. The inlets and outlets may then have a press fit engagement with those stems.

According to a further aspect of the present invention there is provided a method of making a heat exchange element, wherein an initially wet mix, such as concrete, cemet, clay or particulate material mixed with a resin bonding agent is cast or otherwise formed into slab or panel-like form with an internal conduit having at least two ends exposed.

When the conduit is formed by a pipe, it is simply arranged to be embedded in the mix. An alternative method is to have the conduit defined by at least one member that is removed leaving the conduit formed within and by the material of the slab or panel. Preferably this member is soluble or meltable and its removal is achieved by a dissolving agent or by heating the member to melt it out. A waterproofing agent can be flowed through the conduit to leave a waterproof lining.

In another construction two sheets are laminated together, and at least one of them formed with corrugations in the side facing the other sheet, thereby forming said conduit. At least one of these sheets may be of ceramic material and initially flat, and the construction may be formed by deformation of this sheet being depressed between subsequently removable members to adhere to the other sheet. Another method is to have at least one of the sheets grooved before lamination.

Other methods of forming such heat exchange elements includes slip casting and extrusion.

For a better understanding of the invention some constructional forms will now be described by way of example, with reference to the accompanying drawings, in which:

FIG. 1 is a cross-section of a heat exchange element according to the invention, FIG. 2 is a detail of one version of FIG. 1, FIG. 3 is a detail of another version of FIG. 1, FIG. 4 is a cross-section of an edge portion of another heat exchange element, FIGS. 5-9 are cross-sections of parts of other heat exchange elements.

FIG. 10 is a cutaway plan view of a heat exchange element,

FIG. 11 is a similar view of another such element,

Figure 12:
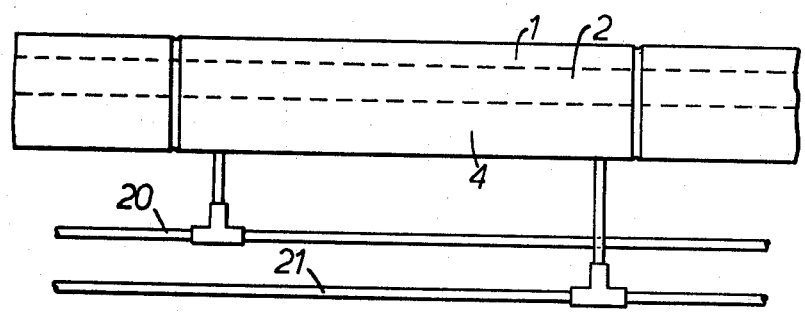
FIG. 12 is a diagrammatic illustration of a heat exchange element forming part of a paved area.

FIG. 1 shows a cross-section of a panel for use in solar heating systems. There are many ways of constructing this panel as will be described in more detail below, but the features common to nearly all of them are an upper surface layer 1 whose exposed surface is made black, or at least very dark, either by a spraying operation, which includes the technique known as stone coating using black granite, or by using a black or dark colourant in the construction of the layer. Below this there is an intermediate layer 2 which contains ducting 3 in which the fluid transfer medium, usually water circulates. Then there is a lower layer 4 which is below or on the reverse side of the panel, facing away from the sun. The layer 4 will generally be thicker than the layer 1 which should be as thin as possible commensurate with the load to be applied to the panel.

The ducting 3 may be formed by piping 5 left embedded in the panel, as shown in FIG. 2, or it may be formed within and by the material of the layer 2 itself, as shown in FIG. 3. For the construction of FIG. 2 the piping 5 is arranged in the desired configuration and the panel is formed around it, as by casting in a mould. The material of the piping may be metal, copper or stainless steel for example, or it may be of plastics of a kind not liable to degrade under the influence either of the surrounding material or the fluid medium. It should be constructed as a single pipe, or several jointed pipe sections, and not as a radiator-like panel, which would make the structure too weak.

The ducting of FIG. 3 may be formed in various ways. Solid members such as rods, can be arranged in the desired configuration of the ducting, and the panel is formed around these. When the material has set, the solid members can be withdrawn. This meas that they must be straight, or at least curved gradually and substantially uniformly, and they should have both ends exposed. FIG. 4 shows the edge portion of such a panel where ducts 6 open into a header 7 which initially is open to the edge and has an outlet or inlet 8 normal to the underside through the layer 4. It will be apparent that rods or the like could form the ducts 6, and a bar transverse to them and a plug can form the header 7 and inlet/outlet 8 respectively. The latter are removed first, after the panel has set, and then the rods can be punched out. The header is finally formed and sealed along the edge by a filler piece 9.

Another method of forming the ducting of FIG. 3 is to use a consumable material to define the ducting while the rest of the panel is formed around it. It can then be removed leaving the ducting open. This is commonly known as a lost wax process. One preferred material is expanded polystyrene, which can be easily shaped into the ducting configuration and which can be dissolved out by immersing the panel in a solvent or introducing solvent under pressure to one or more exposed ends of the ducting. Alternatively the polystyrene may be consumed by the application of heat. Another material suitable particularly when the conditions in which the panel is made are not too hot, is gelatine, which can be removed by heating the panel or by the addition of a liquifier and which leaves very smooth bore ducting.

The panel can be made form a variety of materials but the aim is to use cheap and readily available material, and to avoid extensive use of metal or plastics. Thus it may be a cement based panel, or be made from resin bonded particulate material, or it may be ceramic, or it can be a mixture of these.

FIG. 5 illustrates part of a cement based panel where the upper layer 1 and lower layer 4 are both made from sand, cement and chopped fibres. A wet slurry of this mixture is sprayed into a dewatering tray to form the bottom layer 4, after which the duct formers are laid. The intermediate layer 2 is then applied, and this may consist of an ordinary cement, sand mixture. With the ducts arranged as close as possible, it has been found that the fibrous mixture does not enter satisfactorily into the gaps between the duct formers. In any event this intermediate layer 2 is subject to compressive forces only and an ordinary sand/cement mixture will be adequate. Spraying of the fibrous slurry is then carried out again to complete the upper layer 1. The panel may be finally coated, after curing, with a layer of glass reinforced plastics material 10. The lower layer 4 may be given insulating properties by the cement being aerated and/or by the inclusion of insulating particles. The fibres used to reinforce the cement may be of various kinds, but one preferred one is an alkaline resistant fibre known as an AR fibre. Polypropylene or nylon fibres could be used instead.

FIG. 6 shows a panel construction where ceramics are used, a flat sheet of clay 11 being adhered to a corrugated sheet 12. The sheet 12 when soft may be laid on the sheet 11 with rods 13 interposed and arranged in parallel. The corrugations of sheet 12 are then formed by pressing down between the rods, which are withdrawn when the clay has set.

FIG. 7 illustrates the construction of another ceramic panel. A slip-casting technique is used, two plaster-of-paris moulds 14 and 15 with opposed corrugated faces being brought together, whereupon clay slurry is poured between them. This leaves ducts where the corrugations are widest apart and land areas 16 where they approach closest together.

FIG. 8 shows another laminated construction, where a relatively thick, plate-like base 17 of ceramic material is formed with channels in one surface and then a thin sheet 18 of ceramic material is adhered to that surface to transform the channels into the ducts 3. The base 17 could be of cement based construction.

FIG. 9 shows in cross-section a panel 19 which can be obtained by extruding ceramic material.

FIG. 10 shows in plan one preferred configuration of the ducting. This can be formed either by coiling a pipe into the spiral configuration shown and leaving it embedded in the manner of FIG. 2, or by one of the 'lost wax' techniques. The spiral arrangement is an advantage in providing a lengthy path within a small area without many severe bends and without seriously weakening the structure of the panel. It is particularly advantageous should the water freeze locally: with expansion the ice will extrude along the spiral. The inlet and outlet lead through the layer 4, normal to the general plane of the panel.

From many points of view, if the ducting is an embedded pipe it is preferable that it should be plastics material which flexes. This does not make the protruding ends too vulnerable during manufacture or transit, and if left long enough they easily can be joined together by a common plug so that foreign matter does not enter. They are readily cut to the desired length to join other pipes or fittings.

Another configuration providing a lengthy path in a small area is shown in FIG. 11, where the ducting is generally serpentine with the inlet at one end and the outlet at the other end of the panel.

FIG. 12 illustrates the installation of a panel as part of a paved area. Main flow and return pipes 20, 21 are embedded first, being set in concrete or well compacted sand or aggregate. They are fitted with T-junctions providing upstanding stems at regular intervals corresponding to the spacings of the inlets and outlets of the panels. These are then lowered as paving slabs into positions with the inlets and outlets pressing in watertight manner into the T-junction stems. The pipes 20, 21 are shown at different levels for clarity of illustration, but they would normally be at the same level.

Figure 13:
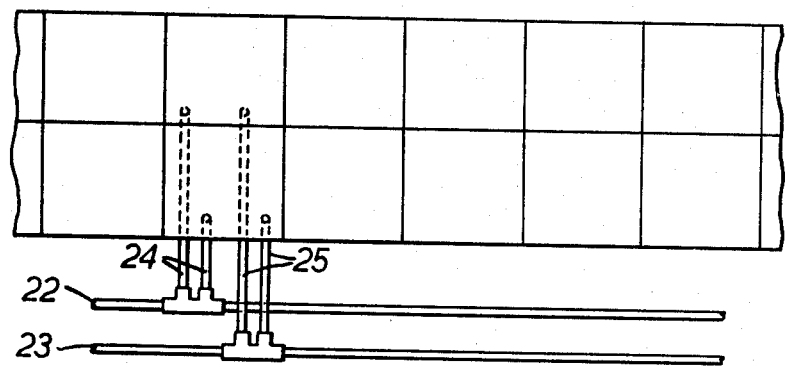
FIG. 13 is a plan view of another arrangement of heat exchange elements.

An alternative arrangement is shown in FIG. 13, where the main flow and return pipes 22, 23 are laid to one side. The panels are connected into this by branch pipes 24, 25 which are embedded in the sand or aggregate foundation. Here plastic pipes are a particular advantage, both for ease of installation and cheapness compared with metal pipes.

Intermediate insulation may be provided between the concrete or aggregate foundation and the paving slabs.

When the ducting is formed within and by the material of the layer 2, as in FIG. 3, there may be added to the manufacturing process the step of waterproofing the ducting. This may be done by directing a liquid waterproofing agent through the ducting to leave an impermeable skin lining the walls. However, the ducting may be left unlined, and if the material of the panel is porous then the circulating water will diffuse through it. The panel can then act as a cooling element, by virtue of evaporation of the water from its exposed surface.

Figure 14:
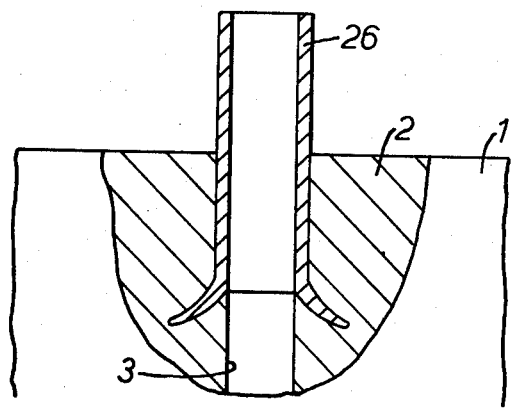
FIG. 14 is a cutaway detail, in plan, of a FIG. 3 type element showing a connector.

Connections to protruding ends of embedded metal or plastics pipes can be made by any conventional means. For connecting the FIG. 3 types of panel, there could be some difficulty in achieving a firm attachment and a water-tight seal by for example, pressing the end of a pipe into an exposed end of the ducting. One method of overcoming this problem is illustrated in FIG. 14, where a short tubular insert 26, of stainless steel for instance, is provided at the inlet/outlet. This has a splayed or otherwise deformed inner end, providing a key which firmly locks it into the intermediate layer 2. It is arranged in position before the casting or other process is started, or at least completed, and it is initially plugged by the consumable material. The outer end is left protruding, and conventional connections can readily be made to it.

As well as being used as paving slabs, as mentioned above, such panels can be used in other modes, for example to clad an inclined bank or roof or a vertical wall surface. In these cases, in order to prevent loss the panels may be mounted behind glazing.

With the layered structure of these panels the adhesion between adjacent layers may be poor and to improve it keying elements may be used. Such elements would be set into the lowermost layer 4 for examle, to project upwardly therefrom and the middle layer 2 would be cast or otherwise applied around them. It would then be securely held once it has set, to the lower layer.

Instead of the fibre reinforcement referred to other forms can be used, such as steel rods or mesh.

In the method involving the dissolving of polystyrene, one suitable dissolving agent is methyl ethyl ketone (MEK). This is recoverable and can be re-used. Likewise gelatine can be re-used, although it may be necessary to add a fungicide to it.

I claim:

1. A solar heating panel constructed principally in layers of cement mixes, upper and lower layers having glass fiber reinforcement and a middle layer being channeled to form a liquid conduit, there being an inlet and an outlet to and from said conduit, said fiber reinforcement being disposed only in said upper and lower layers and said middle layer being substantially free of fiber reinforcement 2. A solar heating panel according to claim 1, wherein the lower layer provides an insulating backing.

3. A solar heating panel according to claim 1, wherein the exposed surface of the upper layer is dark colored.

4. A solar heating panel according to claim 1, in which said cement mixes are mixtures of mineral cement and sand.

* * * * *